Feb. 6, 1973     T. WATSON     3,714,839
PULLEY WITH BELT CLAMPING MEANS
Filed March 30, 1971
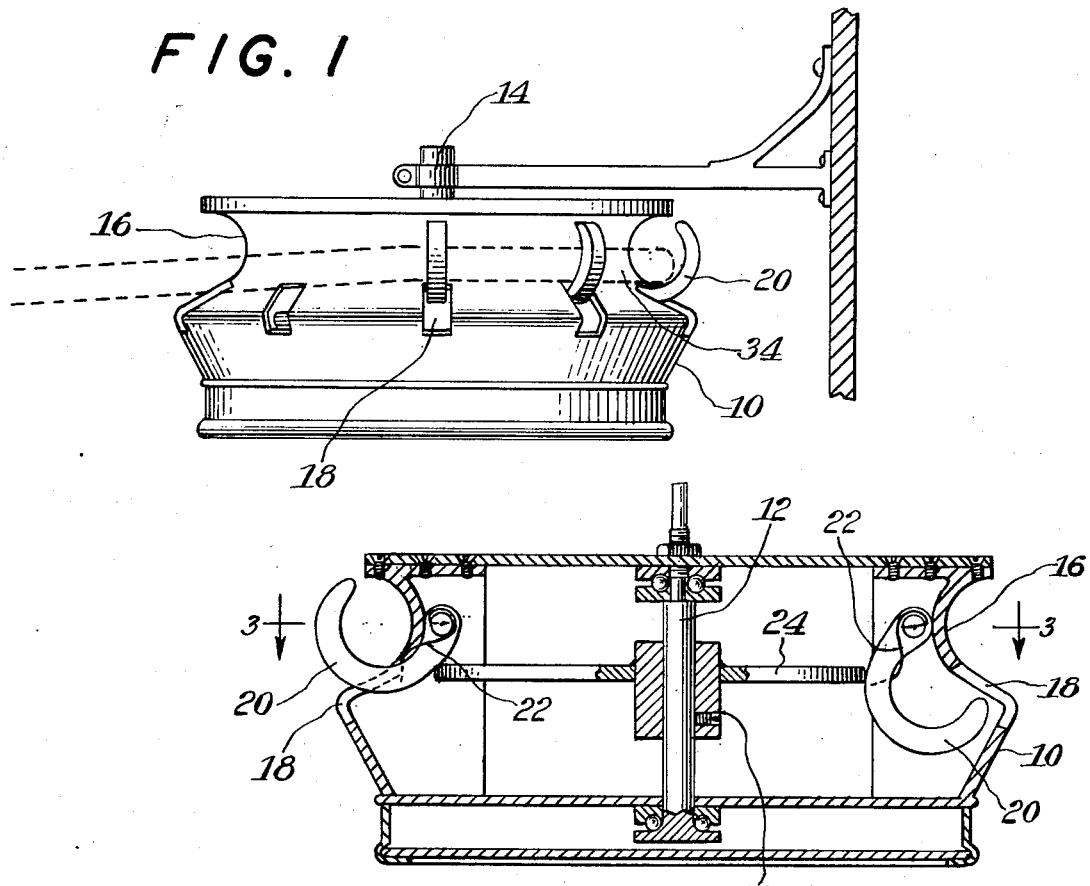
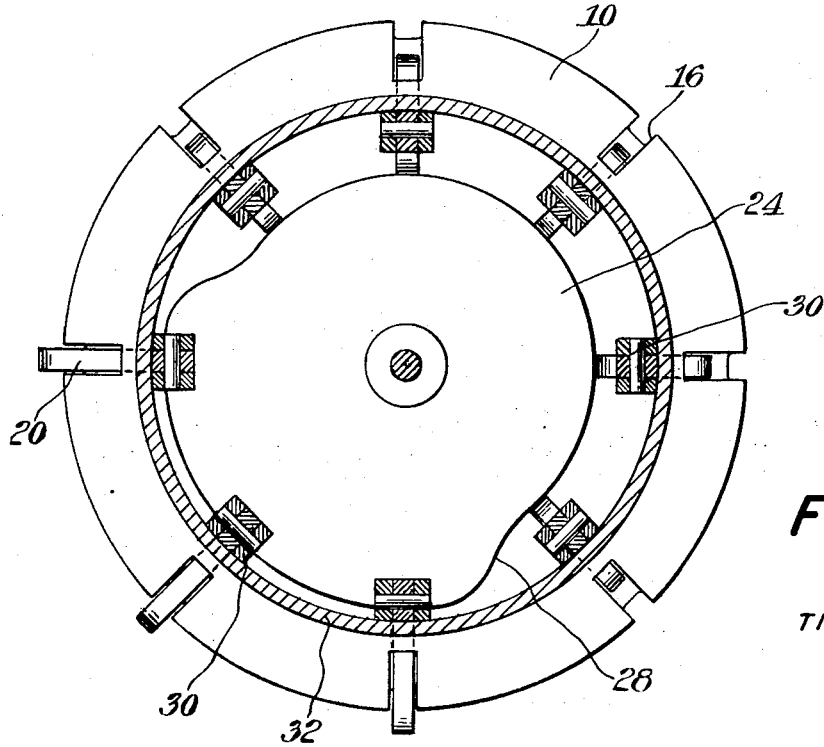
INVENTOR.
TIMOTHY K. WATSON United States Patent Office 3,714,839
Patented Feb. 6, 1973

3,714,839
PULLEY WITH BELT CLAMPING MEANS
Timothy Watson, 1149 Tiffany St.,
Bronx, N.Y. 10459
Filed Mar. 30, 1971, Ser. No. 129,440
Int. Cl. F16h 55/36
U.S. Cl. 74—230.24                   2 Claims

ABSTRACT OF THE DISCLOSURE

A horizontal wheel having a peripheral circular groove is rotatable about a vertical axis. A plurality of hooks having released open positions and taut closed positions are disposed about the groove to cooperate with a flexible line engaging the groove. Cam means cooperate with the hooks control the open or closed positions of same in a manner at which rotation of the wheel causes the hooks to individually open and close in predetermined manner.

SUMMARY OF THE INVENTION

My invention is directed toward a pulley which is provided with means for holding a line therein in nonslip position.

To this end, I provide a horizontal wheel freely rotatable about a fixed vertical axis. The wheel has a circular peripheral groove lying in a horizontal plane. The periphery is also provided with a plurality of spaced vertical slots. A separate hook is disposed in each slot and is provided with a cam follower. Each hook is further provided with spring means normally biasing same in an open position at which the hook is disposed fully behind the groove. A flat horizontal plate of suitable contour is disposed non-rotatably about the fixed axis. The cam followers cooperate with the periphery of the contoured plate which defines a cam surface to progressively close each hook as the wheel rotates. A flexible line is wrapped around the wheel and engages the groove. As the lines move and the wheel rotates, the cam action ensures that a sufficient number of hooks are closed and extend forward of the groove to hold the line in nonslip position. The cam action also ensures that a sufficient number of hooks are open whereby there is no drag on the line exerted by the wheel.

BRIEF DESCRIPTION OF THE DRAWINGS

In the drawings:
FIG. 1 is a side view of my pulley;
FIG. 2 is a cross sectional view thereof; and
FIG. 3 is a view taken along line 3—3 in FIG. 2.

DETAILED DESCRIPTION OF PREFERRED EMBODIMENTS

Referring now to FIGS. 1-3, a hollow horizontal wheel 10 is rotatably disposed about a vertical shaft 12 which serves as an axis and is held in fixed position by support 14. Wheel 10 has a circular peripheral groove 16 which lines in a horizontal plane. Wheel 10 further has a plurality of equidistantly spaced vertical slots 18 (in this example there are eight slots) which cut into the periphery. A separate hook 20 is disposed in each slot. Each hook has a withdrawn position at which it is completely disposed behind the groove and an extended position at which it defines with the adjacent portion of the groove an almost complete ring. Spring means 22 associated with each hook normally biases same into the withdrawn position.

A flat horizontal plate 24 is secured non-rotatably in the hollow wheel by sleeve 26 to shaft 12. The periphery 28 of this plate is contoured and serves as a cam surface Each hook has means 30 at the inner end which cooperates with the cam surface and which bears against an inner horizontal ring 32. When the space between ring 32 and the cam surface is larger than the means 30, the corresponding hook is withdrawn. As a flexible line 34 is wrapped around the groove and moves to rotate the wheel, due to the contour of the cam surface, and as this occurs, the spring bias is overcome and the corresponding hook is gradually extended.

The line is always held in nonslip position against the groove by the hooks that are extended. At the same time a sufficient number of hooks remain open to prevent drag as previously discussed.

While I have described my invention with particular reference to the drawings, such is not to be considered as limiting its actual scope.

Having thus described this invention, what is asserted as new and claimed is:

1. A horizontal pulley wheel, comprising:
   a stationary, vertically-disposed shaft;
   a horizontally-disposed, hollow wheel, rotatably mounted on said shaft, having a circular groove disposed about the periphery of said wheel and a plurality of spaced-apart vertically disposed slots disposed in said wheel equidistant from each other intersecting said circular groove;
   a plurality of semi-circular hooks, pivotably mounted in said wheel and disposed in said slots, said hooks being movable between a fully radially-outwardly extended position and a fully radially-inwardly withdrawn position in said wheel;
   a horizontally-disposed, flat plate, having a contoured periphery which defines a cam surface, disposed in said wheel on said shaft, and coupled to said wheel so as to rotate therewith, said cam surface extending and withdrawing said hooks in said slots between said fully withdrawn and fully extended positions as said plate rotates; and
   spring means, mounted on said wheel and coupled to said hooks, for biasing said hooks towards said fully withdrawn position in said slot.

2. The pulley wheel as recited in claim 1, further comprising cam follower means, disposed in said wheel and coupled to said hooks, for engaging said plate and moving said hooks between said fully extended and fully withdrawn positions in said slots.

References Cited
UNITED STATES PATENTS

| | | | |
|---|---|---|---|
| 2,290,924 | 7/1942 | Watson | 74—230.24 X |
| 1,663,689 | 3/1928 | Ellis | 74—230.24 |
| 3,249,335 | 3/1966 | Eisenhauer | 74—230.24 X |
| 1,366,079 | 1/1921 | Julien | 74—230.24 |

LEONARD H. GERIN, Primary Examiner